United States Patent [19]

Adams

[11] Patent Number: 5,319,613

[45] Date of Patent: Jun. 7, 1994

[54] METHOD AND ARRANGEMENT FOR VERIFICATION OF TARIFF DEFINING POINTS IN TIME IN A TAXIMETER

[75] Inventor: Jürgen Adams, Villingen-Schwenningen, Fed. Rep. of Germany

[73] Assignee: Mannesmann Kienzle GmbH, Villingen, Fed. Rep. of Germany

[21] Appl. No.: 44,124

[22] Filed: Apr. 8, 1993

Related U.S. Application Data

[63] Continuation-in-part of Ser. No. 833,952, Feb. 11, 1992.

[30] Foreign Application Priority Data

Feb. 11, 1991 [DE] Fed. Rep. of Germany ....... 4104057

[51] Int. Cl.⁵ .................. G04B 47/00; G07B 13/08
[52] U.S. Cl. .................. 368/10; 235/30 R; 364/467
[58] Field of Search .............. 368/10, 62, 82, 84; 364/464, 467, 468; 235/30 R, 33

[56] References Cited

U.S. PATENT DOCUMENTS

| | | | |
|---|---|---|---|
| 4,021,645 | 5/1977 | Saufferer et al. | 235/30 R |
| 4,167,040 | 9/1979 | Heritier et al. | 364/467 |
| 4,482,965 | 11/1984 | Tateishi et al. | 364/467 |
| 4,539,644 | 9/1985 | Adams et al. | 364/467 |
| 4,590,571 | 5/1986 | Larsen | 364/467 |
| 4,740,900 | 4/1988 | Adams | 364/467 |

*Primary Examiner*—Vit W. Miska
*Attorney, Agent, or Firm*—Anderson Kill Olick & Oshinsky

[57] ABSTRACT

A method of verification, in a taximeter or a travel distance counter, of tariff defining points in time which are dependent upon a real time clock, includes accelerating to a maximum relevant chronological continuous switching of the taximeter or the travel distance counter by executing a maintenance program in such a way that a chronological work cycle or timing of an evaluating program is effected in a time compressed form for triggering of tariff defining functions. The apparatus includes means for effecting the method.

18 Claims, 3 Drawing Sheets

METHOD AND ARRANGEMENT FOR VERIFICATION OF TARIFF DEFINING POINTS IN TIME IN A TAXIMETER

RELATED APPLICATIONS

This application is a continuation-in-part of U.S. application Ser. No. 07/833,952 for "Method and Apparatus for Verification of Rate Defining Points in Time in a Taximeter", filed Feb. 11, 1992.

FIELD OF THE INVENTION

The invention relates to a method of and an arrangement for verification of tariff defining points in time, for instance, in a taximeter or a travel distance counter, which are dependent upon a clock (rtc—real time clock).

BACKGROUND OF THE INVENTION

Known taximeter devices or travel distance counters have an internal clock with a calendar output, which serves to trigger functions predetermined by tariff or fare parameters. These devices or counters can be automatic tariff changeovers, for instance, for the day to a night tariff or other equivalent changeovers.

In order to verify switchover instants for parameter changes, it is necessary to manually set the clock and the calendar immediately before the expected changeover instant, and then to await the reaction or to institute active tests with the aim of finding, for instance, a tariff effect before and after the actual switchover instant.

A series of rtc—standard building blocks provides for the possibility of accelerating the normal sequence in the counters for the purpose of a check of the correct transfer between the second, minute, hour and calendar counters by bridging over the prescaler chains for downscaling the typical quartz oscillator frequency.

However, such an acceleration possibility is unavailable to the time defined taximeter functions.

SUMMARY OF THE INVENTION

It is an object of the invention to provide a method of and an arrangement for verifying the parametric functions of a taximeter apparatus or travel distance counter in a time compressed sequence.

This object is achieved in that the relevant chronological continuous switching of a taximeter or the travel distance counter, to be verified, is accelerated to a maximum by execution of a maintenance program in such a way that a time sequence or a chronological work cycle of an evaluating program is called forth in a time-compressed form for triggering tariff defining functions.

Expedient refinements of the inventive method and the inventive arrangement are discussed hereinafter.

For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

In the drawings:

FIGS. 1 and 1A are flow diagram of an operating mode of a taximeter according to the invention (Main Loop);

FIGS. 2 and 2A are flow diagram of the mode of operation (SCOM); and

DETAILED DESCRIPTION OF THE PREFERRED EMBODIMENTS

Figure 3:
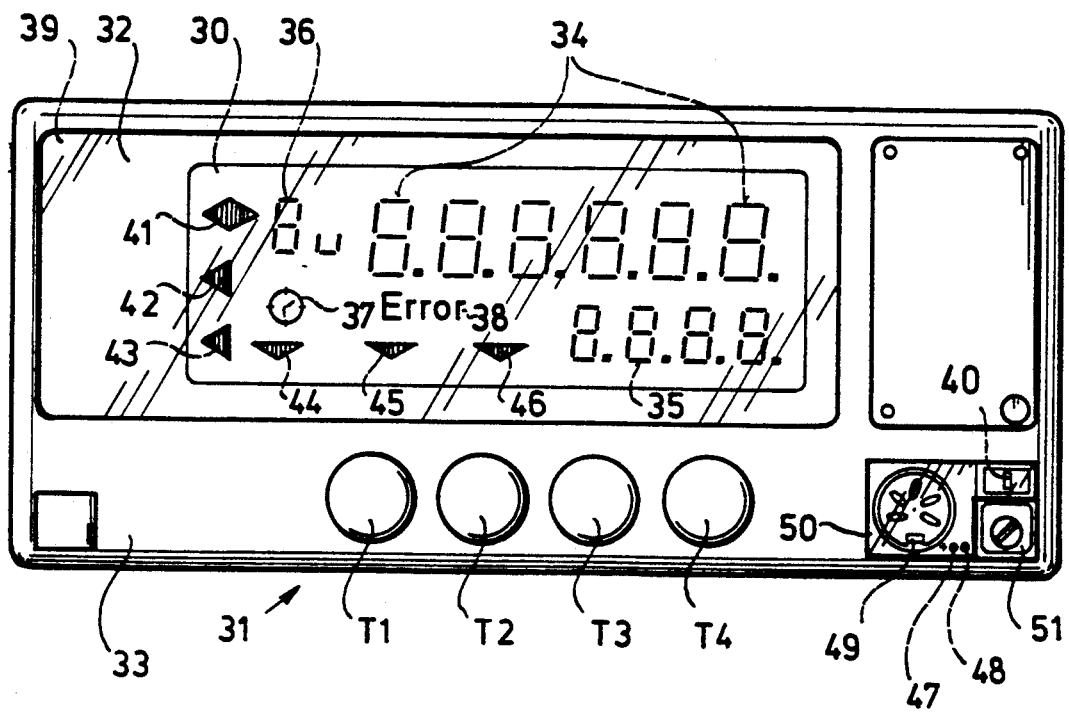
FIG. 3 is a front view of a taximeter with displayand operator's control elements.

FIG. 3 shows a front view of a modern taximeter or travel distance counter with a display 30 and four operator's control elements 31 in the form of pushbuttons T1 to T4, by means of which corresponding switches S1 to S4, which are not shown here, are actuated on a printed circuit board. The display 30 is also fastened on the printed circuit board and can be read through a front glass panel 32 on the front side of a housing shell 33. The display 30 is subdivided into a plurality of selectable display elements and comprises a main display 34 and an ancillary display 35, a tariff stage display 36, a time-computing symbol 37, an error word display symbol 38, as well as six flags 41 to 46.

The main display 34 consists of a six-digit number and serves, when used, to display a tariff, a distance traveled, control counter values, parameters and as a fault indicator. The ancillary display 35 is a four digit number, by means of which, in actual usage, a surcharge, an amount of a tip, a fixed value (for instance, the amount of a distance traveled), a maintenance index (for service), a function indicator of the maintenance program or a pulse counting in the test mode are displayed. Corresponding to a selectable segment combination, the tariff stage display 36 shows the digit-wise selected tariff stage. The time charge symbol 37 configured as a clock symbol, indicates the status of a time charge within the tariff stage.

The flags 41 to 46 are freely parametrizable symbols for assisting the display of special functions of separate tariff stages. The flag 41 serves as a rule for marking the tariff stage adjustment, flag 42 for indicating a "collection" position in a tariff stage, finally flag 43 as a pointed arrow points out the functional position "free" printed on a screen 39. The flag 44 can, for instance, mark the display of the control counters. The setup flag 45 indicates a release of a parametric condition, which occurs in connection with the setup of a switch 40 to so designated release contacts 47 (for "0") and 48 (for "1"). The release contacts 47 and 48 are enabling contacts which make accessible different functions or data in the taximeter or the travel distance counter to an authorized person, one, e.g., who performs security testing of the taximeter. These functions or data may include tariff parameters, test functions which, under normal circumstances, should not be accessible to the conventional user (i.e., a taxi driver or a member of the public).

Further, an eight-pole test connector 49 is provided which serves for data input/data output through a serial interface. For securing against manipulations, the access to the release contacts 47, 48 and to the test connector 49 is protected with a cover cap 50 which is secured by a lead seal 51 for securing the tariff relevant clock and calendar data, the call-up of the maintenance program and with this the possibility of an acceleration, for instance, of a time stepping, is put under the protection of the lead seal 51. Prior to calling up the maintenance program, the lead seal 51 must be broken, which seal at the same time protects also other functions, such as a parametrization, erasing functions and other test functions against actuation by misuse. After removal of the lead seal and the cover cap 50, the now accessible test switch 40 can be actuated. Thereupon, the clock (rtc) in the taximeter device can be set to the start instant and the start date, if the start instant and the start date do not already correspond to the current time of day and to the current date.

A testing arrangement and a type of process for verification of tariff defining events in a taximeter or a travel distance counter, which are a function of a clock (rtc), will now be described. In the course of the execution of an autonomous test, the test preparation consists in a call-up or execution of a maintenance program, the basic functions of which are defined by the following steps: establishing the starting readiness for an accelerated run-down of the clock (rtc) and erasure of the event counter. The event counter is utilized for a simplified review of whether, within a specific time period, i.e., test time period, all events have been recognized. The events are defined when a time plane list is prepared. The time plane defines, e.g., day/night switchover on workdays. To this end, the night/day switchover is set to occur at 6:00 o'clock, and day/night switchover at 22:00 o'clock. Thus, in the time period from 0 to 23:59 hours, the event counter should indicate 2, as two (2) events are set to occur.

Figure 1:
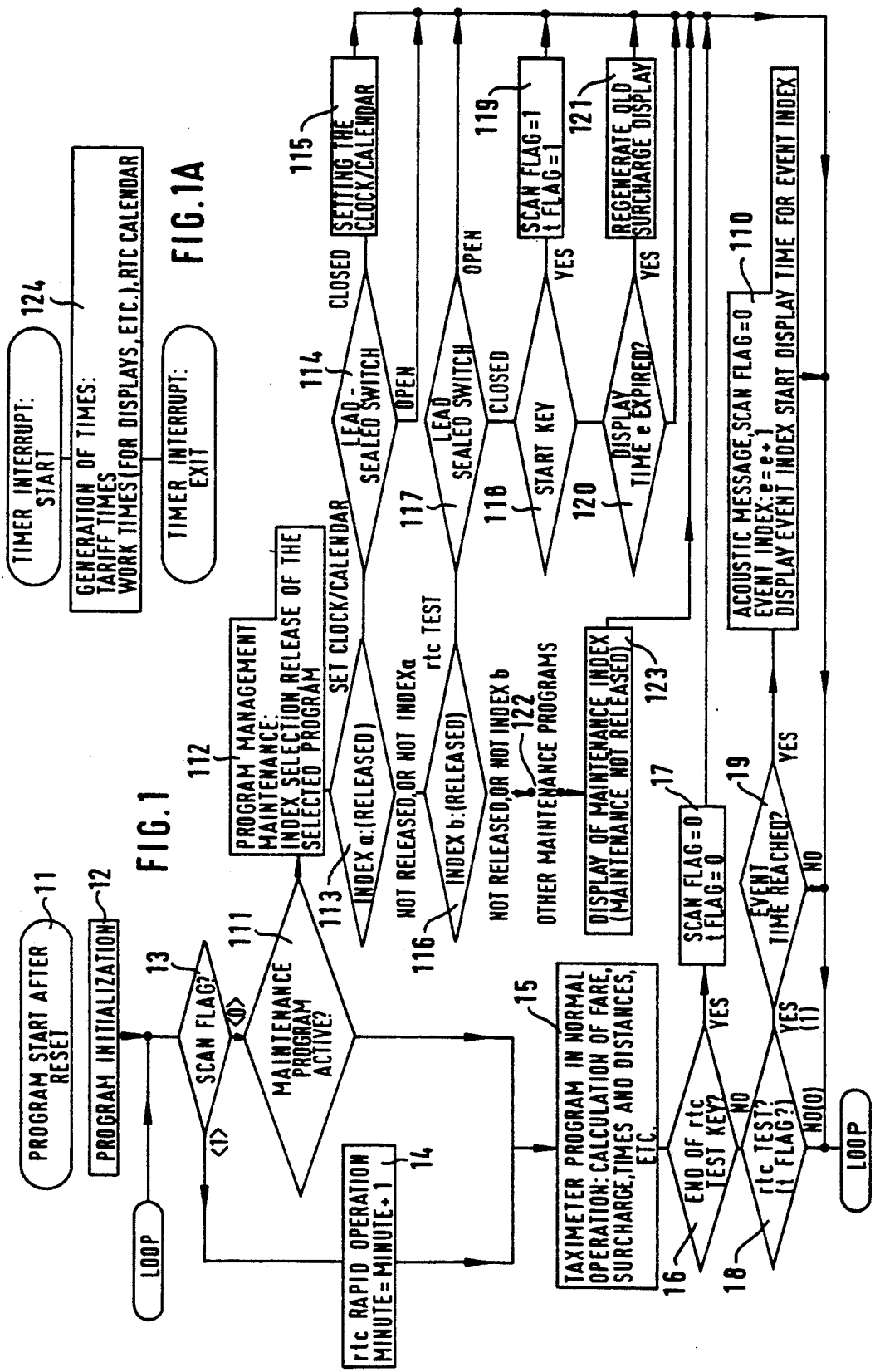

With the help of the operational mode of a taximeter, which is shown in the flow diagram in FIG. 1, the start of the test is initiated by switching a tariff on, thus by switching from the position "free" to "occupied". Before starting the test, the lead seal 51 should be removed, and the test switch 40 need be actuated. The switching is then effected, in an autonomous test, by means of push-buttons. The switching can also be effected by connection of a test device (e.g. Laptop), as will be described later. The test starts with a search for a "defining event" by accelerated counting of the rtc and calendar counters. The rtc is continuously counted up by one added minute with each program loop (see FIG. 1). With each program loop there occurs also a complete check of all parametrized instants which could be tariff relevant. If a defining event, as for instance, a day/night switchover, the beginning or the end of a holiday, or another event, is recognized, then the continuous counting up of the rtc is stopped, and an acoustic announcement is made through a beeper 52, and a counting of the reference point in the event counter with a display for a fixed, definable tim follows.

Generally, on the basis of a tariff signal, specific types of behavior of the taximeter are expected to occur, when preset points in time of events are reached. Thus, a day/night switchover is expected to occur, e.g., at 22.00 hours on a workday, and the rts/calendar test permits to determine whether this switchover actually takes place at 22.00 hours. The main display may show at that, e.g., the actual fare of the set up tariff stage. The ancillary display may show, selectively, (i) actual surcharge (or zero, or nothing) and (ii) actual event counter.

If an expected event did not occur, a check of an influence upon the tariff parameters is possible, especially with a possibility of adding predetermined tariff stages which can be determined by a manual change of the actual tariff stage by the operator's control elements 31 including the performance of switching sequences from "free" to "occupied", to "free" to . . . , and so forth.

Furthermore, it is possible to verify the influence on the effects of parameters such as incrementally switched distances, incrementally switched time periods (waiting times), basic and incrementally switched amounts as well as additional parameters having an effect on the fare, such as surcharges, percentage add-ons and/or reductions and so forth.

Furthermore, it is also possible to verify the influence on a direct switchover of tariff parameters caused by the timing of an event, especially on a direct switchover of tariff stages.

The remaining sequence of the maintenance program or of the test can then be effected by actuating one of the operator's control pushbutton T1 to T4 which is designated for this purpose.

If repetitive and non-repetitive event points are listed in the set of parameters for defining the events, for instance, definition of irregular holidays, then it is expedient to use a filtering of the defining events in such a way that the initial occurrence of repetitive events is marked by an acoustic announcement, counted in the sequence by means of a counter and temporarily displayed in the surcharge display. With this, one has the possibility, for instance, in case of changeover day/night or night/day, to make available these points in time for a verification and thereafter only to accept event points in time which are defined as nonrepetitive points in time.

An assignment of the events to the associated rtc-times and calendar positions occurs by comparing the values in the event counter.

In the first phase all of the event counter values are noted in sequence after the start and continuation of the test, as has been described before. Thereupon, the maintenance program is called up for setting the rtc and renewed adjusting of the rtc to the test-starting time and the test-start-calendar values. At the same time, the event counter is turned back while keeping the time display for starting and continuation of the test.

In a second phase there occurs an assignment of the time and calendar values after each stop, caused by the recognition of an event point, to the list of the event counter values, which were received in the course of the testing sequence in the event counter.

Deviating from the previously described autonomous tests, the invention also provides performance of an automatic test with the use of a testing instrument. The test preparation consists here in coupling the test instrument to the taximeter, the test instrument being preferably a "hand-held computer" or "Laptop" coupled to the test connector 49 of the taximeter, and establishment of a communication session(LOG-ON).

The start of the test is initiated by a starting command emanating from the testing instrument. The issuance of the start command can be effected from a keyboard of the testing instrument. With the starting signal, rtc is influenced in a manner which has already been explained in connection with the autonomous test. Thus, continuous counting of the rtc by 1 minute more per program loop, testing of all parametric points in time, when recognizing an event, follow the aforementioned series of actions described as "stop the rtc, an acoustic announcement, counting in the event counter with display for a definable time".

A manual verification of the influence on the tariff is possible, as has already been explained in connection with the autonomous test; however, this is not a primary goal.

With each recognition of the point in time of an event such as day/night-switchover, start or end of a weekend period, and other event times, the testing instrument performs an assignment of the event, in such a way that the advance effect is fetched from the set of parameters for definition of the rtc functions and is textually put out on the display of the testing instrument.

The continuation of the tests, respectively after recognition of the point in time of an event, can be effected manually by means of the keyboard of the test instrument, or continuously, wherein prior to that, test end datum should be preset in the test instrument. With a continuous test, a list of the event points in time, with the respective effect advance prediction (gathered from the taximeter parameters), can be generated.

In accordance with another feature of the invention, a combination of the autonomous tests with the possibility provided by the testing instrument connected to the test connector 49, the two-phase verification of event points in time can be reduced to one phase in such a way that, with the occurrence of any random event point, the associated clock time and the calendar date can be indicated directly on the display of the test instrument, simultaneously with a tariff occurrence.

The automatic test can be expanded to the extent that a behavior test comparable to the manual tariff test, as has been described in connection with the autonomous test, can be effected in the operational state "occupied". The manual operational sequences can be standardized and performed by the testing instrument through appropriate simulation (by remote control).

In the standardized operational sequence, the parameters depending upon the event point in time can be received by the testing instruments and be compared with advance input through serial communication by interrogation of the system status as well as by interrogation of the tariff relevant data with continuous switching from "free" to "occupied" to "free" to . . . , and so on.

Figure 2:
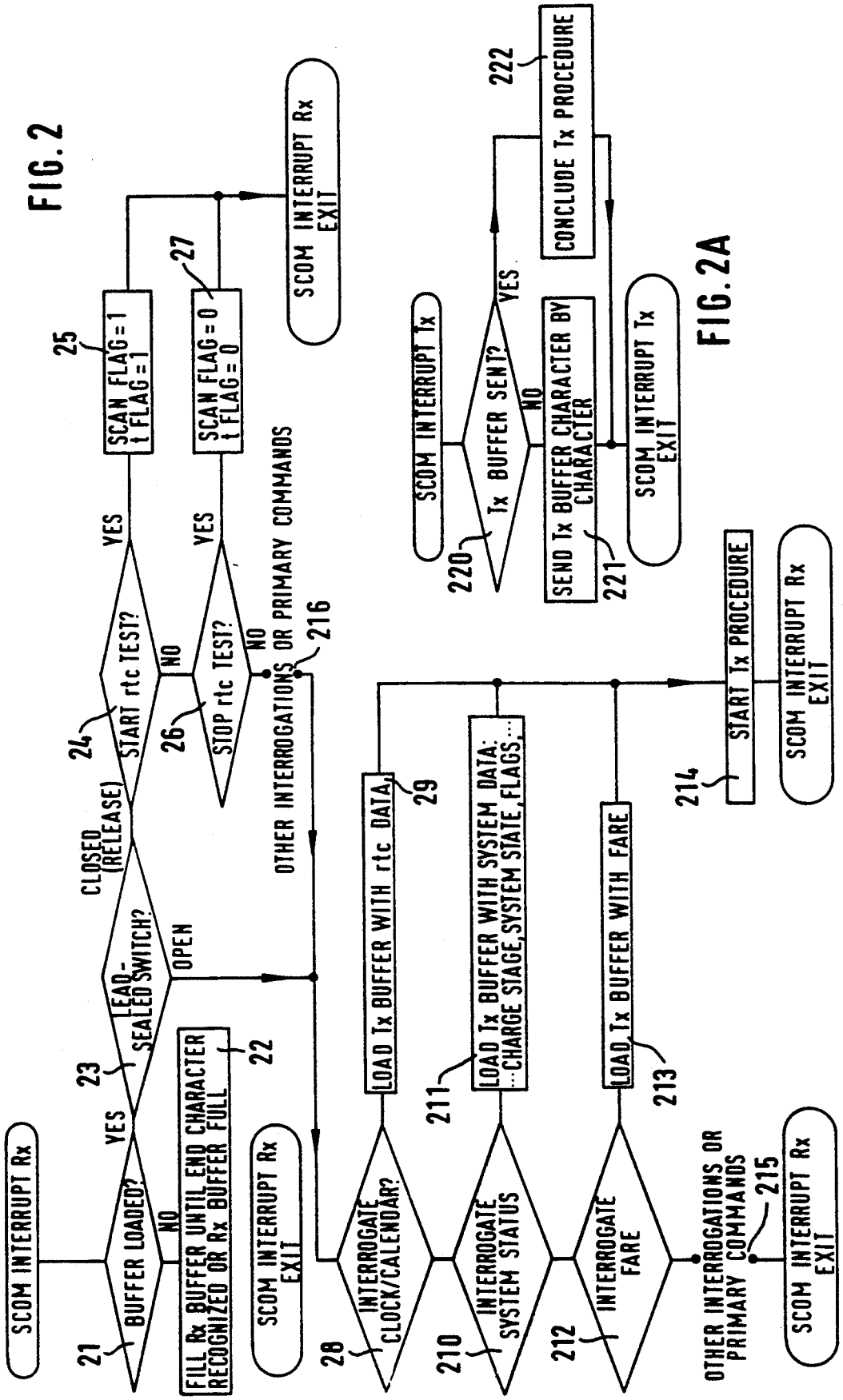

It will be appreciated that a modern taximeter is controlled by a programmable microprocessor. The flow diagrams shown in FIGS. 1 and 2 illustrate program routines for the purposes indicated to implement the method of the invention.

The mode of operation of the method according to the described embodiment of an autonomous step will be explained with reference to FIG. 1. The flow diagram of FIG. 1 shows the operational process steps of a taximeter of the invention. In the steps 11 and 12 the beginning or start of the process program is depicted after application of the operational voltage to the taximeter device or after a voltage decline and a subsequent initialization of the conventional RAM, which is incorporated in such a device. In particular, processes such as loading of constants, loading of the work stage, a presetting of control flags (control bits), a setting of the display parameter (hardware driver mode for the LCD) and others, and, finally an initializing of the ports form parts of these steps.

In the steps 13 and 14, a test of the control flag (scan-flag) for the minute incrementing rapid travel branch 14 takes place. The scan-flag is set in a maintenance program provided for the scan-flag and is set back again when an event point 19 (for instance day/night switchover) is reached.

The minute register (minute counter) is computed upwards on each passage of the main loop (beginning with 13). The upward computing speed is a function of the duration of the loop revolutions, so that with each increase a control of the program 15, as well as the inquiry 19, can be run through.

In the method step 15, the taximeter program runs its normal operation and includes a combination of all standard program parts required for forming the fare and the surcharge (selection of tariff stages, travel and time computation, automatic tariff stage switchovers, and so forth). The "normal operation" means here execution of the taximeter program, without the influence of test routines which are not described here.

In the process or method steps 16 and 17, a possibility of a manual test termination by operating the pushbuttons T1 to T4 is provided, in order to avoid "endless loops". The appropriate pushbutton is not defined more accurately. It is however, practically an operating pushbutton, which is not used in the standard program 15 which, however, is at least marked there, as long as the test proceeds.

The steps 18, 19, 110 show a program branch with a control flag (t-flag) for a normal run and a test run, independently of the control flag (scan-flag), which serves only for release of the program branch 14. If step 19 has recognized an event point in time, an event-marking 110 takes place, together with an acoustic announcement and display. The step 19, if necessary, receives the information from different flags, which are not designated more accurately in this instance.

Steps 111 and 112 provide that a maintenance operation can be released (activated) in the program portion 13 out of the normal operation in such a way that, in position "free", the maintenance programs with the branch 111 can be called up or executed by the program part 111 by actuating a not more precisely defined operating pushbutton. In part, these programs can only be activated if prior to that the lead sealed switch 47, 48 (after breaking the lead seal 51) is closed.

The set-up for the maintenance program remains the same for the rtc-test 14, 18, 19, 110, so that after recognizing an event instant according to 19, 110 and setting back of the scan-flag, a new start with the steps 118, 119 can immediately take place, or the display time control can be executed.

The program management maintenance routine 112 is used for selection of programs from a list or for release of the appropriate program from the maintenance index.

There exists a series of maintenance programs which are differentiated by a number (the a, b index) which is shown in the ancillary display 35. The list is available to the authorized personnel (possibly also to the taxi driver) from the operational manual. The programs are listed according to their functions.

After release of the maintenance program 113 in the step 113 for resetting the clock, which release, as being conventional, need not be explained in detail, the clock can be reset in step 115. The inquiry 114 of the lead sealed switch prevents unauthorized access during operation, without tests, that is, in the course of normal operation of the taximeter.

In execution of the steps 116, 117, 118, 119, a not clearly designated pushbutton can start the rtc-test, after release of the maintenance program 116 for the rtc-test as well as after authorization in the step 117, by removing the lead seal 51 and closing the lead sealed switch 47, 48. This occurs by the setting of the control flags t-flag and scan-flag.

As far as steps 120, 121 are concerned, the following takes place. In the program part 110, the display of an event counter is initiated as well as a display time is fixed. After expiration of this time, wherein the time control as such can be placed in step 124, pushbutton recall of the "old" display 121 takes place, typically a surcharge display entered previously in the course of the test.

It should be noted in connection with the routine involving the steps 122, 123, that other maintenance programs can be differently specified for one of the subsequently enumerated purposes: for adaptation to the travel, for pass code-input and control, for parameter input, for pulse simulation (travel/time), for signature generation and display, and many more. If no maintenance program has been released (a release in 112 is not explained in detail), there results the display of the index which permits a selection of a maintenance program.

FIG. 2 shows a flow diagram for a supplementary explanation of the mode of operation by means of a communication session using the test connector 49 of the taximeter (SCOM). The steps 21, 22 represent the way to operate for a asynchronous retrieval of serial data, which are stored in a data buffer memory. A "half-duplex-operation" is assumed. The buffer is held to be charged, if its capacity is exhausted, or if a control symbol, especially "carriage return", was received as a last symbol of a string.

The following is to be observed with regard to the routine 23, 24, 25, 26, 27. Accessing the command-inquiries 24 and 26 can occur only if the switch, which can be sealed by a lead seal, is closed in step 23 by an appropriate authorization. The control flags (t-flag and scan-flag) are directly influenced by the commands "start-rtc-test" and "stop-rtc-test", so that in the illustrated program loop in FIG. 1, the appropriate test sequences can be executed also without manual intervention.

After recognition of the command "inquiry-clock calendar" in step 28, the data of the clock (counter-data) are copied into the transmission buffer (Tx-buffer).

In steps 210, 211, the momentary or actual state of the apparatus can be determined by inquiring the system status, especially in automated tests.

Steps 212, 213, 214 show, by way of an example, a fare inquiry which leads, just as the other inquiries, to the program portion 214 "Transmit-procedure start". In a separate interrupt program portion, the buffer content is then transmitted byte by byte.

Finally, in the steps 220, 221, 222, processing of the transmission of the Tariff-buffer, which is started by the program portion 214, takes place. In step 222, a switch-over to receiving operation occurs, since the communication proceeds in the "half-duplex-operation".

Based on the illustrated flow diagrams, those skilled in the art should have no difficulty in implementing the method of the invention for the purposes stated above.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A method of verification, in a taximeter or a travel distance counter, of tariff defining points in time which are dependent upon a real time clock, wherein said method comprises:

the step of accelerating to a maximum relevant chronological continuous switching of one of the taximeter and the travel distance counter by executing a maintenance program in such a way that a chronological work cycle of an evaluating program is effected in a time compressed form for triggering of tariff defining functions; and the step of checking in a program-controlled manner whether a predetermined tariff defining function occurred at a predetermined tariff defining point.

2. The method of claim 1, wherein the accelerating step is carried out on a basis of a chronological continuous switching in a minute cycle.

3. The method of claim 1, further comprising the step of operating a push button for executing the maintenance program.

4. The method of claim 1, wherein the maintenance program is executed by serial communication.

5. An arrangement for verification, in a taximeter or a travel distance counter, of tariff defining points in time which are dependent on a real time clock, wherein said arrangement comprises:

means for starting a maintenance program;

means for accelerating to a maximum relevant chronological continuous switching of one of the taximeter and the travel distance counter by executing a maintenance program in such a way that a chronological work cycle of an evaluating program is effected in a time compressed form for triggering of tariff defining functions; and means for checking in a program-controlled manner whether a predetermined tariff defining function occurred at a predetermined tariff defining point.

6. The arrangement of claim 5, further comprising means for marking stopping of the chronological work cycle.

7. The arrangement of claim 5, further comprising means for counting each stoppage, and a display for displaying a counting status of each stoppage of the working cycle for a specific time, wherein a value previously displayed thereon is temporarily substituted.

8. The arrangement of claim 5, further comprising a serial interface for connecting a test instrument for controlling an automatic verification work cycle in such a way that, in accordance with the predetermination of a testing program, a change in status of the taximeter is effected, including an inquiry and verification of the associated data and parameters for a respective operational state.

9. The arrangement of claim 8, wherein the test instrument, connectable to the serial interface, comprises means for recording all repetitive and non-repetitive event points and an output of same in the form of a listing.

10. A method of verification, in a taximeter or a travel distance counter, of tariff defining points in time which are dependent upon a real time clock, wherein said method comprises:

the step of accelerating to a maximum relevant chronological continuous switching of one of the taximeter and the travel distance counter by executing ma maintenance program in such a way that a chronological work cycle of an evaluating program is effected in a time compressed form for triggering of tariff defining functions; and the step of stopping the chronological work cycle started by the maintenance program upon appearance of at least one defining event for the purpose of a dedicated tariff selection; and further wherein said stopping step is effected by a day/night switchover.

11. A method of verification, in a taximeter or a travel distance counter, of tariff defining points in time which are dependent upon a real time clock, wherein said method comprises:
- the step of accelerating to a maximum relevant chronological continuous switching of one of the taximeter and the travel distance counter by executing a maintenance program in such a way that a chronological work cycle of an evaluating program is effected in a time compressed form for triggering of tariff defining functions;
- the step of stopping the chronological work cycle started by the maintenance program upon appearance of at least one defining event for the purpose of a dedicated tariff selection; and
- further wherein said stopping step is effected by one of a start and an end of a weekend period.

12. A method of verification, in a taximeter or a travel distance counter, of tariff defining points in time which are dependent upon a real time clock, wherein said method comprises:
- the step of accelerating to a maximum relevant chronological continuous switching of one of the taximeter and the travel distance counter by executing a maintenance program in such a way that a chronological work cycle of an evaluating program is effected in a time compressed form for triggering of tariff defining functions;
- the step of stopping the chronological work cycle started by the maintenance program upon appearance of at least one defining event for the purpose of a dedicated tariff selection; and
- further wherein said stopping step is effected by utilization of special parameters in a weekend period.

13. A method of verification, in a taximeter or a travel distance counter, of tariff defining points in time which are dependent upon a real time clock, wherein said method comprises:
- the step of accelerating to a maximum relevant chronological continuous switching of one of the taximeter and the travel distance counter by executing a maintenance program in such a way that a chronological work cycle of an evaluating program is effected in a time compressed form for triggering of tariff defining functions;
- the step of stopping the chronological work cycle started by the maintenance program upon appearance of at least one defining event, for the purpose of a dedicated tariff selection; and
- further wherein said stopping step is effected by one of a beginning and an end of a holiday period.

14. A method of verification, in a taximeter or a travel distance counter, of tariff defining points in time which are dependent upon a real time clock, wherein said method comprises:
- the step of accelerating to a maximum relevant chronological continuous switching of one of the taximeter and the travel distance counter by executing a maintenance program in such a way that a chronological work cycle of an evaluant program is effected in a time compressed form for triggering of tariff defining functions;
- the step of stopping the chronological work cycle started by the maintenance program upon appearance of at least one defining event for the purpose of a dedicated tariff selection; and
- further wherein said stopping step is effected by utilization of special parameters in a holiday period.

15. A method of verification, in a taximeter or a travel distance counter, of tariff defining points in time which are dependent upon a real time clock, wherein said method comprises:
- the step of accelerating to a maximum relevant chronological continuous switching of one of the taximeter and the travel distance counter by executing a maintenance program in such a way that a chronological work cycle of an evaluating program is effected in a time compressed form for triggering of tariff defining functions;
- the step of stopping the chronological work cycle started by the maintenance program upon appearance of at least one defining event for the purpose of a dedicated tariff selection; and
- further wherein said stopping step is effected by one of a beginning and an end of summer time or winter time.

16. A method of verification, in a taximeter or a travel distance counter, of tariff defining points in time which are dependent upon a real time clock, wherein said method comprises:
- the step of accelerating to a maximum relevant chronological continuous switching of one of the taximeter and the travel distance counter by executing a maintenance program in such a way that a chronological work cycle of an evaluating program is effected in a time compressed form for triggering of tariff defining functions;
- the step of stopping the chronological work cycle started by the maintenance program upon appearance of at least one defining event for the purpose of a dedicated tariff selection; and
- further wherein said stopping step is effected by ne of beginning and an end of a seasonally caused special tariff period, which is represented by one of a vacation period, a fair, and a show.

17. An arrangement for verification, in a taximeter or a travel distance counter, of tariff defining points in time which are dependent on a real time clock, wherein said arrangement comprises:
- means for starting a maintenance program;
- means for accelerating to a maximum relevant chronological continuous switching of one of the taximeter and the travel distance counter by executing a maintenance program in such a way that a chronological work cycle of an evaluating program is effected in a time compressed form for triggering of tariff defining functions; and
- marking means for producing an acoustic announcement and counting of each stoppage of the working cycle.

18. An arrangement for verification, in a taximeter or a travel distance counter, of tariff defining points in time which are dependent on a real time clock, wherein said arrangement comprises:
- means for starting a maintenance program;
- means for accelerating to a maximum relevant chronological continuous switching of one of the taximeter and the travel distance counter by executing a maintenance program in such a way that a chronological work cycle of an evaluating program is effected in a time compressed form for triggering of tariff defining functions; and
- means for filtering of a predetermined tariff defining event occurrence in such a way that, when a first occurrence of repetitive events is announced and counted and temporarily displayed, a renewed occurrence of the same even does not lead to a stoppage of the time sequence period.

* * * * *